Dec. 7, 1926.

F. H. CHANDLER 1,609,694

TOASTING OR COOKING APPARATUS

Filed May 24, 1926    2 Sheets-Sheet 1

Inventor
FRANK H. CHANDLER

By
Attorney

Dec. 7, 1926.
F. H. CHANDLER
1,609,694
TOASTING OR COOKING APPARATUS
Filed May 24, 1926    2 Sheets-Sheet 2
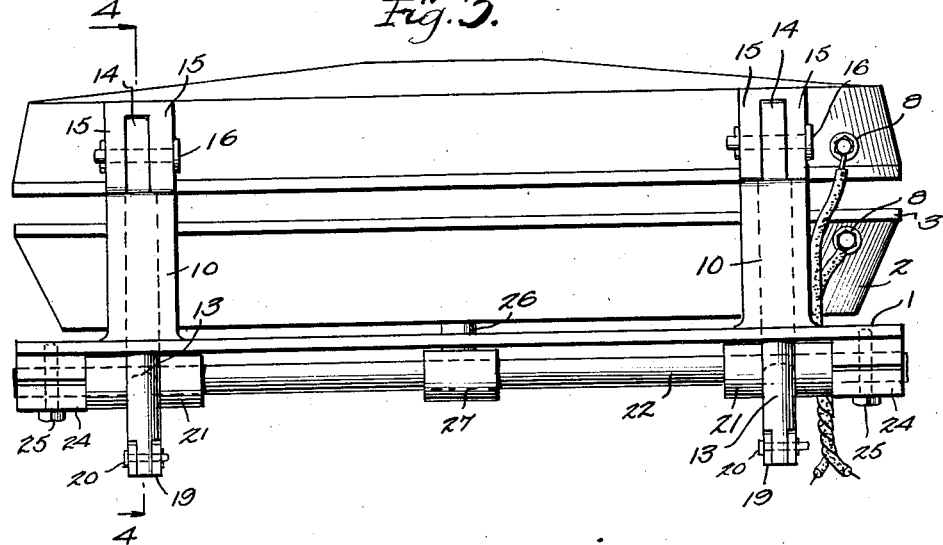
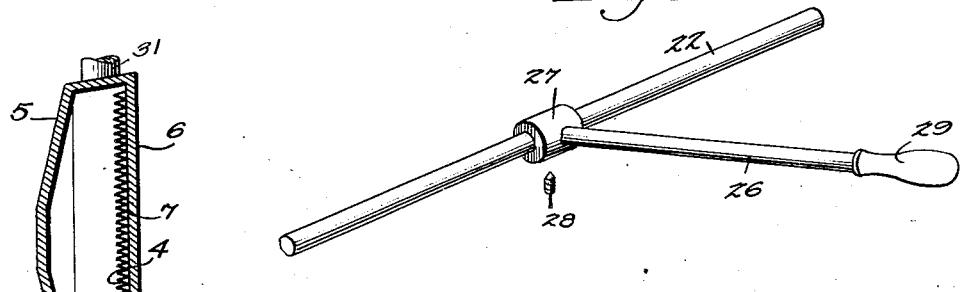
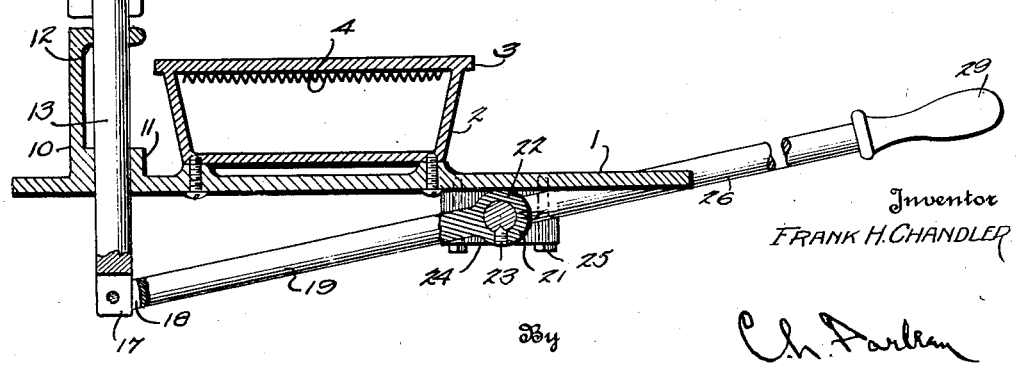
Inventor
FRANK H. CHANDLER
By Ch. Parker
Attorney Patented Dec. 7, 1926.

1,609,694

UNITED STATES PATENT OFFICE.

FRANK H. CHANDLER, OF DANVILLE, ILLINOIS, ASSIGNOR TO C. V. CHAMPION & COMPANY, OF DANVILLE, ILLINOIS, A CORPORATION OF ILLINOIS.

TOASTING OR COOKING APPARATUS.   REISSUED

Application filed May 24, 1926. Serial No. 111,439.

This invention relates to toasting or cooking apparatus and is an improvement over the construction described and claimed in my copending application filed May 15, 1925, Serial No. 30,574.

In the said application I have described and claimed a cooking apparatus consisting of upper and lower plates having means for adjusting the distance between the plates whereby articles of different sizes or thickness may be cooked on both sides simultaneously, the upper plate being hinged to permit it to be moved to an inoperative position when placing articles on the apparatus or removing them therefrom.

An object of the present invention is to provide improved means for adjusting the distance between the two plates.

More specifically I provide a frame or base on which the lower plate is mounted having vertically movable supporting members on which the upper plate is mounted and to which it is hinged.

Figure 1:
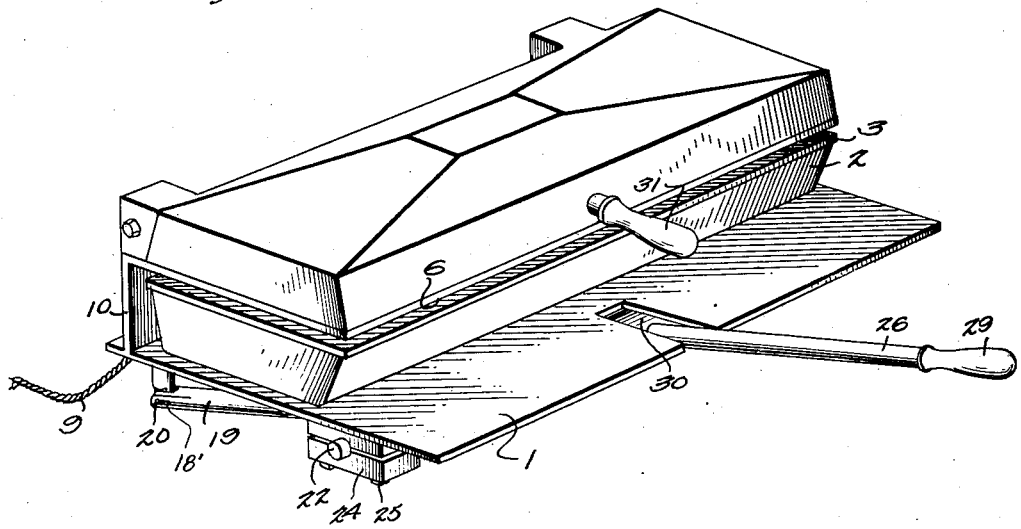
Figure 2:
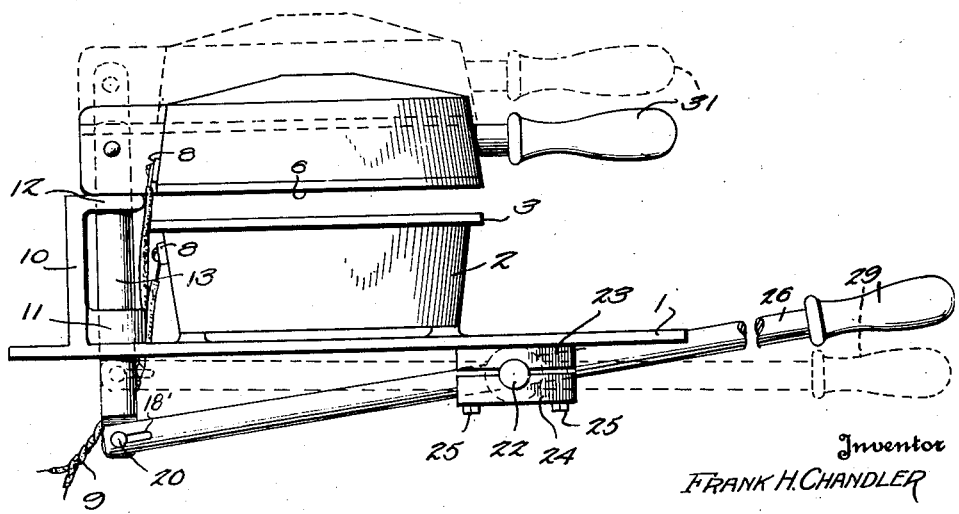

In the accompanying drawings I have shown one embodiment of the invention. In this showing, Figure 1 is a perspective view, Figure 2 is a side elevation, the raised position of the upper plate being indicated in dotted lines, Figure 3 is a rear elevation, Figure 4 is a vertical sectional view on line 4—4 of Figure 3 showing the upper plate swung upwardly on its hinges, and Figure 5 is a perspective view of an operating handle and shaft.

Referring to the drawings, the reference numeral 1 designates a suitable base or support adapted to receive a housing or casing 2. The lower cooking plate 3 is arranged on this housing and suitable heating elements 4 are arranged within the housing immediately adjacent this plate (see Figure 4). I further provide an upper housing 5 having an upper cooking plate 6 adapted to be arranged over the lower cooking plate as shown in Figures 1, 2 and 3, and spaced therefrom a desired distance depending upon the article to be cooked or toasted. Adjacent the cooking plate and within the housing I provide suitable heating elements 7. As shown, the heating elements 4 and 7 are connected to binding posts or terminals 8 arranged on the back of the housings and adapted to be connected to suitable lead wires 9.

The upper cooking plate is capable of vertical adjustment with respect to the lower cooking plate and is also hingedly mounted to permit it to be swung to the position shown in Figure 4 of the drawings for the purpose of placing articles of food in the apparatus or removing them therefrom. As shown, guide bearings 10 are arranged at the back of the base adjacent each side and these bearings are provided with sleeves 11 and 12 which receive vertical supporting members or rods 13. The upper ends of these rods are reduced in thickness as at 14 and are adapted to be received between a pair of ears 15 formed on the rear edge of the upper housing. Suitable pivot pins 16 are passed through alined openings in the rods and the ears. The lower ends of the rods are also reduced in cross section as at 17 and are adapted to be received in the forked ends 18 of arm 19. The supporting rods and the arms are pivotally connected to each other by means of pins 20. The forked ends 18 of the arms 19 are provided with the slots 18' to permit the pins 20 to slide therein to prevent binding of the parts when the arms 19 are actuated. The forward ends of the arms are provided with sleeves 21 adapted to receive an operating or adjusting shaft 22. As shown, the sleeves are secured to the shaft by means of set screws 23 to cause them to revolve therewith. This shaft is mounted in bearings arranged at opposite sides of the base and consisting of upper sections 23 and lower sections 24 secured to each other by means of bolts 25. This permits the bearing to be adjusted to engage the shaft with sufficient friction to retain the apparatus in an adjusted position and prevent the weight of the housing or casing 5 from lowering the rods. An operating lever 26 is connected to the shaft 22. As shown, this lever is provided with a sleeve 27 on its inner ends adapted to surround the shaft and is secured thereto by means of a set screw 28. A suitable handle 29 is arranged on the outer end of the lever. The front edge of the base may be provided with a slot 30 to permit passage of this lever when in an inclined position. The upper housing may also be provided with a handle 31 to be grasped by the operator when it is to be swung to the raised position shown in Figure 4 of the drawings.

The operation of the device will be apparent from the foregoing description. While the apparatus may be used for any type of cooking or toasting it is particularly adapted for toasting sandwiches and the like. When toasting slices of bread or other thin articles of food the plates are arranged adjacent each other as shown in full lines in Figure 2 of the drawings. When toasting a prepared sandwich or other food article of appreciable thickness the distance between the plates is adjusted so that the plates will contact with the upper and lower surfaces of the article to be toasted or cooked thus permitting the two sides to be toasted or cooked at the same time. To move the upper cooking plate away from the lower cooking plate the operating lever 26 is swung downwardly to the dotted line position shown in Figure 2 of the drawings causing the shaft to move in a counter clockwise direction and swing the rear ends of the arms 19 upwardly thus raising the supporting rods 18 and the upper cooking plate to the dotted line position. By having the bearings of the shaft 22 sufficiently tight the apparatus may be adjusted to any desired intermediate position and the friction of the bearings on the shaft will retain the apparatus in such position overcoming the weight of the upper housing. When placing articles of food on the apparatus or removing them the upper housing may be swung to the position shown in Figure 4 of the drawings by grasping the handle 31 and moving it upwardly.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. In a device of the character described, a lower cooking plate, movable supporting members carried by said lower cooking plate, a lever arm for vertically adjusting said supporting members, and an upper cooking plate carried by said supporting members.

2. In a device of the character described, a lower cooking plate, vertically movable supporting members carried by said lower cooking plate, and an upper cooking plate hingedly mounted on said supporting members.

3. In a device of the character described, a lower cooking plate, guide bearings mounted on said lower cooking plate, vertically movable supporting rods mounted in said guide bearings, means for actuating said rods and an upper cooking plate carried by said supporting rods.

4. In a device of the character described, a lower cooking plate, guide bearings mounted on said lower cooking plate, vertically movable supporting rods mounted in said guide bearings, and an upper cooking plate hingedly mounted on said rods.

5. In a device of the character described, a lower cooking plate, a pair of supporting rods mounted on said lower cooking plate and movable vertically with respect thereto, an upper cooking plate carried by said rods, arms connected to the lower ends of said rods, and means for actuating said arms to adjust said rods and said upper cooking plate.

6. In a device of the character described, a lower cooking plate, a pair of vertically movable supporting rods carried by said lower cooking plate, an upper cooking plate carried by said rods, arms connected to the lower ends of said rods, a shaft to which said arms are connected, and means for oscillating said shaft.

In testimony whereof I affix my signature.

FRANK H. CHANDLER.